(12) United States Patent
Jacobs

(10) Patent No.: US 9,489,017 B2
(45) Date of Patent: Nov. 8, 2016

(54) KEY RETRACTION

(71) Applicant: HEWLETT-PACKARD DEVELOPMENT COMPANY, L.P., Houston, TX (US)

(72) Inventor: Steven K Jacobs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/786,357

(22) PCT Filed: Aug. 26, 2013

(86) PCT No.: PCT/US2013/056687
§ 371 (c)(1),
(2) Date: Oct. 22, 2015

(87) PCT Pub. No.: WO2015/030714
PCT Pub. Date: Mar. 5, 2015

(65) Prior Publication Data
US 2016/0170451 A1    Jun. 16, 2016

(51) Int. Cl.
*G06F 3/02* (2006.01)
*G06F 1/16* (2006.01)
*H01H 13/7065* (2006.01)

(52) U.S. Cl.
CPC ........... *G06F 1/1671* (2013.01); *G06F 1/1662* (2013.01); *G06F 1/1666* (2013.01); *G06F 3/0221* (2013.01); *H01H 13/7065* (2013.01)

(58) Field of Classification Search
CPC ... G06F 1/1666; G06F 3/0221; H01H 13/86; H01H 13/7065; H01H 2223/052
See application file for complete search history.

(56) References Cited

U.S. PATENT DOCUMENTS

| 4,403,123 A * | 9/1983 | Shek | H01H 13/16 200/61.89 |
| --- | --- | --- | --- |
| 5,532,904 A | 7/1996 | Sellers | |
| 5,977,888 A * | 11/1999 | Fujita | H01H 13/705 200/12 |
| 6,510,048 B2 | 1/2003 | Rubenson et al. | |
| 6,761,494 B2 * | 7/2004 | Hsu | H01H 3/125 200/343 |
| 6,922,333 B2 | 7/2005 | Weng et al. | |
| 8,102,647 B2 | 1/2012 | Bhutani et al. | |
| 8,206,047 B1 | 6/2012 | Isaac et al. | |
| 8,309,870 B2 | 11/2012 | Peterson et al. | |
| 2004/0252104 A1 * | 12/2004 | Nakamura | G05G 9/047 345/160 |
| 2010/0239345 A1 | 9/2010 | Sip | |
| 2011/0165843 A1 | 7/2011 | Wang | |
| 2011/0170250 A1 | 7/2011 | Bhutani et al. | |
| 2012/0169603 A1 * | 7/2012 | Peterson | G06F 3/0202 345/168 |
| 2012/0299832 A1 * | 11/2012 | Peterson | G06F 3/0202 345/168 |
| 2014/0125436 A1 * | 5/2014 | Kinoshita | H01H 13/85 335/219 |

(Continued)

FOREIGN PATENT DOCUMENTS

KR    20000008265    2/2000

OTHER PUBLICATIONS

Pete, "Touchfire Keyboard for iPad", <http://www.maclitigator.com/2012/07/06/touchfire-keyboard-for-ipad/ >, Jul. 6, 2012.

*Primary Examiner* — Jennifer Simmons
*Assistant Examiner* — Marissa Ferguson Samreth
(74) *Attorney, Agent, or Firm* — HP Inc. Patent Department

(57) ABSTRACT

A retraction mechanism moves a depressable key downward along a sloped surface from a raised state to a retracted state relative to a deck.

14 Claims, 9 Drawing Sheets

(56) References Cited

U.S. PATENT DOCUMENTS

| | | | | |
|---|---|---|---|---|
| 2014/0151204 A1* | 6/2014 | Chen | ................ | H01H 13/02 200/310 |
| 2014/0168875 A1* | 6/2014 | Nakamura | ............ | G06F 1/1666 361/679.09 |
| 2014/0183019 A1* | 7/2014 | Misawa | ................ | G06F 1/1616 200/5 A |
| 2014/0311880 A1* | 10/2014 | Krumpelman | .......... | H01H 13/14 200/5 A |
| 2015/0034470 A1* | 2/2015 | Kimura | ................ | G06F 3/0202 200/5 A |
| 2015/0341030 A1* | 11/2015 | De Saulles | ........... | G06F 1/1616 341/32 |
| 2016/0118203 A1* | 4/2016 | Moua | ................... | H01H 13/705 307/115 |

* cited by examiner

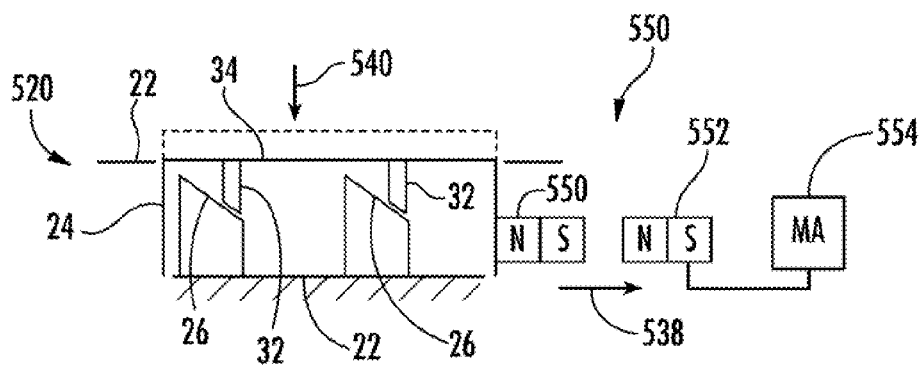
FIG. 6
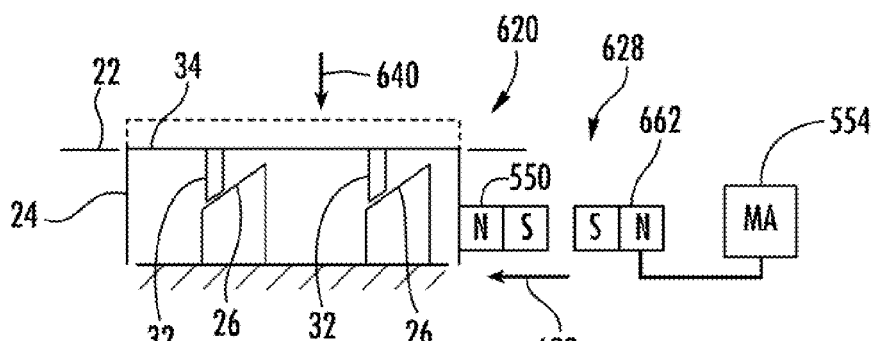
FIG. 7
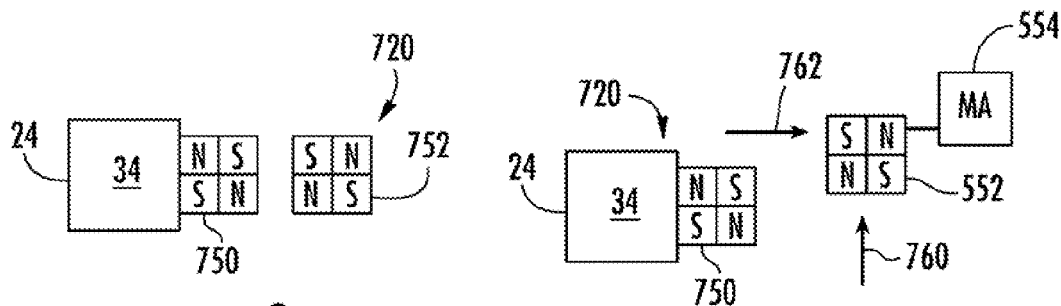
FIG. 8
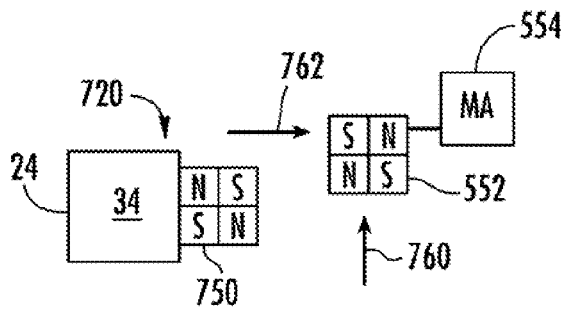
FIG. 9
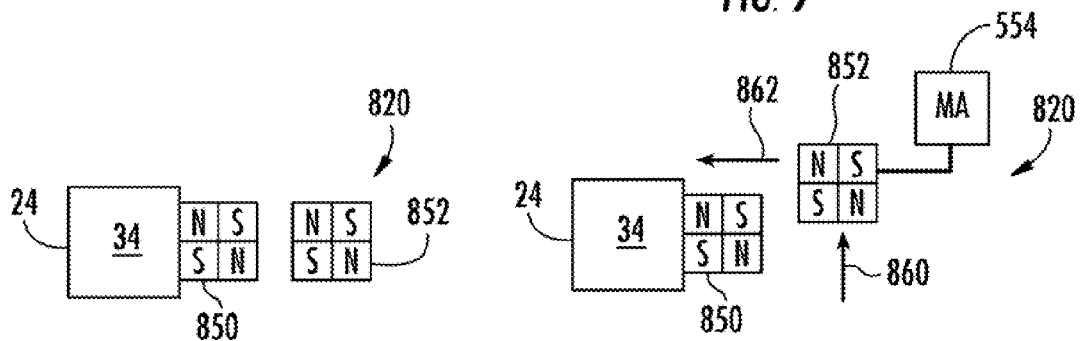
FIG. 10
FIG. 11

KEY RETRACTION

BACKGROUND

Electronic devices are sometimes equipped with depressable keys to facilitate the input of information, selections or commands. Such depressable keys may increase the thickness of the electronic device.

BRIEF DESCRIPTION OF THE DRAWINGS

FIG. 6 is a schematic illustration of another example electronic device having a key in a retracted state.

FIG. 7 is a schematic illustration of another example electronic device having a key in a retracted state.

FIG. 8 is a schematic illustration of another example electronic device having a key in a raised state.

FIG. 9 is a schematic illustration of the electronic device of FIG. 8 illustrating movement of a magnet to move the key to a retracted state.

FIG. 10 is a schematic illustration of another example electronic device having a key in a raised state.

FIG. 11 is schematic illustration of the electronic device of FIG. 8 illustrating movement of a magnet to move the key to a retracted state.

DETAILED DESCRIPTION OF THE EXAMPLE EMBODIMENTS

Figure 1:
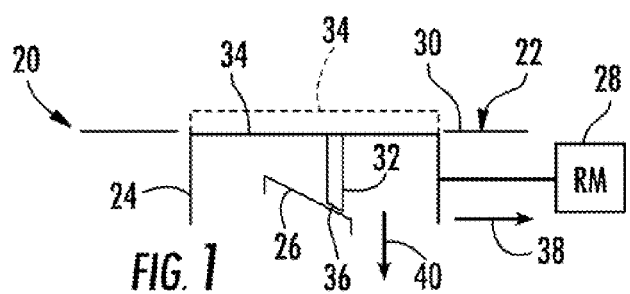
FIG. 1 is a schematic illustration of an example electronic device having a key in a retracted state.

FIG. 1 illustrates an example electronic device 20. As will be described hereafter, electronic device 20 utilizes a sideways or transverse force and a sloped surface to move a key from a raised state to a retracted state. As a result, the key may be retracted without application of force to a top of the key. Electronic device 20 comprises deck 22, key 24, ramp 26 and retraction mechanism 28.

Deck 22 comprises a base structure housing electronic components of device 20 and supporting keys 24. In some implementations, deck 22 may support additional input devices as well such as touchpads, switches, slider bars and the like. Deck 22 may have a variety of different sizes, shapes and configurations depending upon the use of electronic device 20. Deck 22 comprises an upwardly facing surface 30 above which keys 24 proudly rise when in a raised state.

Key 24 comprises a manually depressable protuberance or projection to facilitate the input of information, selections or commands to electronic device 20. Key 24 is a resiliently biased to the raised state in which a top surface 34 of key 24 projects above surface 30 as shown in broken lines. In the example illustrated, key 24 comprises a ramp rider 32 which rides against along ramp 26. In the example illustrated, ramp rider 32 comprises a sloped surface or ramp 36 which slides along ramp 26. In other implementations, ramp rider 32 may omit sloped surface 36.

Ramp 26 comprises a sloped surface along which ramp rider 32 slides or rolls as it moves from the raised state to a retracted state. Ramp 26 converts or redirects received sideways or transverse motion or force into a downward force to move key 24 to the retracted state. In the example illustrated, ramp 26 is supported by and extends from portions of deck 22 below surface 30. In implementations where key 24 includes a ramp or sloped surface, such as sloped surface 36, ramp 26 may be replaced with a ramp rider that slides or rolls along the sloped surface 36.

Retraction mechanism 28 comprises a mechanism configured to apply a transverse force to key 24 in the direction indicated by arrow 38. As shown by FIG. 1, the transverse force drives key 24 downward along ramp 26 in the direction indicated by arrow 40, perpendicular to the top surface 34, to the retracted state. Key 24 is driven to the retracted state without force being directly applied to top surface 34 or without direct contact with top surface 34.

Figure 2:
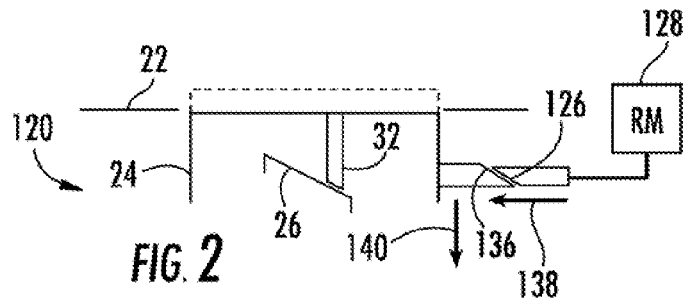
FIG. 2 is a schematic illustration of another example electronic device having a key in a retracted state.

FIG. 2 illustrates electronic device 120, another example of electronic device 20. Electronic device 120 is similar to electronic device 20 except that electronic device 120 comprises ramps 126 and 136 in place of ramps 26 and 36 and specifically comprises retraction mechanism 128. Ramp 126 comprises a sloped surface which is translatable so as to interact with ramp 136. Ramp 136 comprises a sloped surface carried by key 24. Retraction mechanism 128 comprises a mechanism to linearly translate ramp 126 in the direction indicated by arrow 138, parallel to surface 34. During translation of ramp 126, ramp 126 contacts and interacts with ramp 136 to redirect the transverse motion in the direction of arrow 138 to a downward direction as indicated by arrow 140 to move key 24 to the retracted state. In other implementations, one of ramps 126, 136 may be omitted and replaced with a non-ramped structure that rolls or slides along the provided ramp 126, 136.

Figure 3:
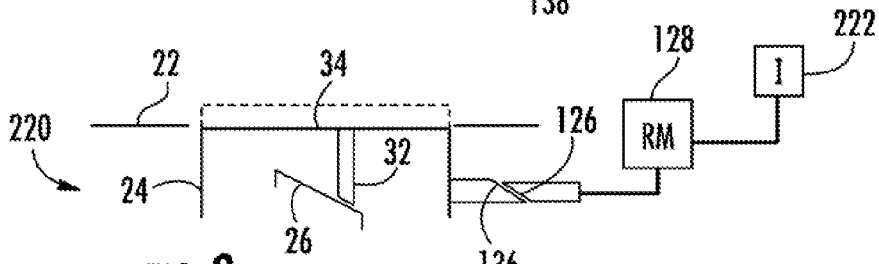
FIG. 3 is a schematic illustration of another example electronic device having a key in a retracted state.

FIG. 3 illustrates electronic device 220, an example implementation of electronic device 120. Electronic device 220 is similar to electronic device 120 except that electronic device 220 is illustrated as further comprising input 222. Input 222 comprises a switch, button or other input device by which retraction mechanism 128 may be turned on or actuated to move ramp 126 against ramp 136 so as to retract key 24. In one implementation, input 222 comprises a switch located along surface 30 of deck 22 or along a side of deck 22 for being manually moved to actuate retraction mechanism 128. In yet another implementation, input 222 may comprise a graphical user interface presented on a display screen, which upon being selected, actuates or turns on retraction mechanism 128.

Figure 4:
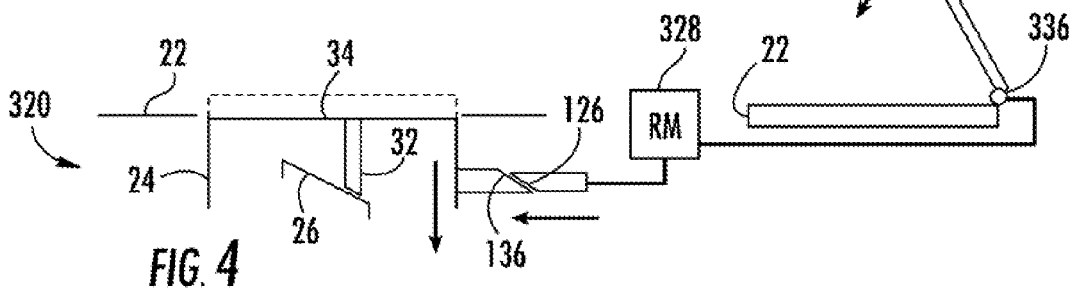
FIG. 4 is a schematic illustration of yet another example electronic device having a key in a retracted state.

FIG. 4 illustrates electronic device 320, another example implementation of electronic device 120. Electronic device 320 is similar to electronic device 120 except that electronic device 320 comprises display panel 327 and retraction mechanism 328. Display panel 327 comprises a panel supporting a display screen. Display panel 327 is pivotally coupled to deck 22 for movement between an open or deployed position and a covering or closed position in which display panel 327 extend substantially parallel to deck 22. In the example illustrated, display panel 327 comprises portions of a hinge 336 which facilitate pivoting of display panel 327 relative to deck 22. In other implementations, display panel 327 may be pivotally coupled to deck 22 by other pivot mechanisms.

Retraction mechanism 328 is operably coupled to hinge 336 and display panel 326 such that retraction mechanism 328 automatically moves ramp 126 in response to pivoting of display panel 327 downward towards deck 22 and towards the closed position. In one implementation, retraction mechanism 328 comprises one or more linkages, cables, gears or other motion transmitting mechanisms operably coupled to hinge 336 or display panel 327. In another implementation, retraction mechanism 328 comprises an electronic switch which is automatically actuated to move ramp 126 in response to pivoting of display panel 326. In some implementations, retraction mechanism 128 provides dwell such that movement of ramp 126 is delayed until being triggered based upon display panel 327 being pivoted to within a predetermined angular position with respect to deck 22.

Figure 5:
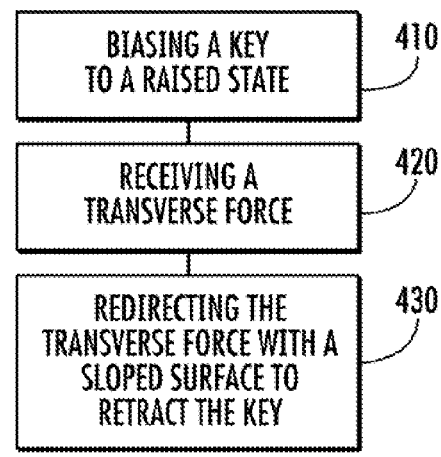
FIG. 5 is a flow diagram of an example method that may be carried out by the electronic device of FIGS. 1-4.

FIG. 5 is a flow diagram of an example method 400 that may be carried out by any of electronic devices 20, 120, 220 and 320 described above. As indicated by step 410, a depressable key 24 of electronic device is biased to a raised state. In the raised state, the top surface 34 of the key 24 projects above the top surface 30 of the surrounding deck 22. As indicated by step 420, the key 24 receives a transverse or sideways directed force or motion. In the example above, such sideways or transverse motion or force is provided by retraction mechanism 128. As indicated by step 430, the transverse force is redirected with at least one sloped surface such that key 24 is moved to a retracted state in which the top surface 34 of the key is at or below a top surface 30 of the surrounding deck 22.

FIG. 6 illustrates electronic device 520, an example implementation of electronic device 20. As will be described hereafter, electronic device 520 magnetically retracts depressable key 24 to a retracted state to reduce a thickness of the electronic device 520. Electronic device 520 is similar to electronic device 20 except that electronic device 520 specifically comprises a plurality of ramps 26 and ramp riders 32 and further comprises retraction mechanism 528. Those remaining components of electronic device 520 which correspond to electronic components of electronic device 20 are numbered similarly.

Ramps 26 and ramp riders 32 are located along opposite sides of key 24. Ramps 26 and ramp riders 32 cooperate to uniformly support key 24 and guide key 24 between the raised state (shown broken lines) and the retracted state (shown in solid lines). In other implementations, electronic device 520 may be provided with a greater or fewer of such ramps and ramp riders. During movement of key 24 between the raised state and the retracted state, ramp rider 32 moves along ramps 26. In other implementations, key 24 may be movably guided by other structure such as by a sleeve which slides along a guide rod. In yet other implementations, other guiding structures may be utilized. For example, in other implementations, movement of key 24 may be guided through an opening or along a guide post.

Retraction mechanism 528 applies transverse or sideways magnetic forces to drive key 24 to the retracted state. Retraction mechanism 528 comprises magnet 550, magnet 552 and magnet actuator 554. Magnet 550 comprises a magnet coupled to key 24 so as to be carried by key 24 between the raised state and the retracted state. Magnet 552 comprises a magnet positioned proximate to magnet 550 so as to interact with magnet 552 to exert a force upon key 24. In the example illustrated in FIG. 6, magnet 552 interacts with magnet 550 to attract magnet 552 to apply a force to key 24 in the transverse direction indicated by arrow 538. As a result, ramp riders 32 ride along ramps 26 to move key 24 downward in the direction indicated by arrow 540 perpendicular to surface 34 of key 24 from the raised state (shown broken lines) to the retracted state (shown in solid lines).

Magnet actuator 554 comprises a device or component that is operably or electrically coupled to magnet 552 to actuate magnet 552 to and from a retracting state in which magnet 552 interacts with magnet 552 to retract key 24. In one implementation, magnet actuator 554 is operably coupled to magnet 552 to move magnet 552 into and out of the retracting state. In one implementation, magnet actuator 554 may translate magnet 552 into and out of the retracting state. In another implementation, magnet actuator 554 may rotate magnet 552 into and out of the retracting state. In yet another implementation, in which magnet 552 comprises an electromagnet (as compared to a permanent magnet) magnet actuator 554 may selectively apply electrical current to magnet 552 to actuate magnet 552 into and out of the retracting state. In one implementation, magnet actuator 554 may reverse the direction of electrical current being supplied to the electromagnet serving as magnet 552 to reverse polarities of magnet 552. Conversely, in some implementations, magnet 550 may comprise an electromagnet, wherein magnet actuator 554 instead electrically actuates magnet 550 to and from a retracting state with respect to magnet 552.

FIG. 7 illustrates electronic device 620, another example implementation of electronic device 520. Electronic device 627 electronic device 520 except that electronic device 620 utilizes repulsive or repelling magnetic forces to drive key 24 to the retracted state. In particular, electronic device 620 comprises retraction drive 628 which comprises magnet 662 in place of magnet 562. Magnet 662 has polarities such that magnet 662, when in the retracting state, repels magnet 550 to apply a transverse force in the direction of arrow 638. As a result, ramp riders 32 ride along ramps 26 to move key 24 downward in the direction indicated by arrow 640 perpendicular to surface 34 of key 24 from the raised state (shown broken lines) to the retracted state (shown in solid lines).

FIGS. 8-14 illustrate various example implementations in which magnet actuator 554 physically moves magnet 552 or magnet 662 to actuate magnet 552 or magnet 662 into and out of the retracting state. FIGS. 8 and 9 are top views of electronic device 720, an example implementation of electronic device 520. Electronic device 720 is similar to electronic device 520 except that electronic device 720 specifically comprises bitwise magnets 750 and 752 in place of magnets 550 and 552. FIG. 8 illustrates magnets 750 and 752 positioned relative to one another such that magnets 750 and 752 repel one another to bias key 24 upward along ramps 26 to the raised state. As shown in FIG. 9, magnet actuator 554 transversely moves magnet 752 in the direction indicated by arrow 760 such that magnet 752 attracts magnet 750 and applies a transverse force in the direction indicated by arrow 762. Similar to electronic device 520, electronic device 720 utilizes such attractive magnetic forces to move key 24 to the retracted state by moving ramp riders 32 downward along ramps 26 (shown in FIG. 6).

FIGS. 10 and 11 are top views of electronic device 820, an example implementation of electronic device 620. Electronic device 820 is similar to electronic device 620 except that electronic device 820 specifically comprises bitwise magnets 850 and 852 in place of magnets 550 and 652. FIG. 10 illustrates magnets 850 and 852 positioned relative to one another such that magnets 850 and 852 attract one another to bias key 24 upward along ramps 26 to the raised state. As shown in FIG. 11, magnet actuator 554 transversely moves magnet 852 in the direction indicated by arrow 860 such that magnet 852 repels magnet 850 and applies a transverse force in the direction indicated by arrow 862. Similar to electronic device 620, electronic device 820 utilizes such repelling magnetic forces to move key 24 to the retracted state by moving ramp riders 32 downward along ramps 26 (shown in FIG. 7).

Figure 12:
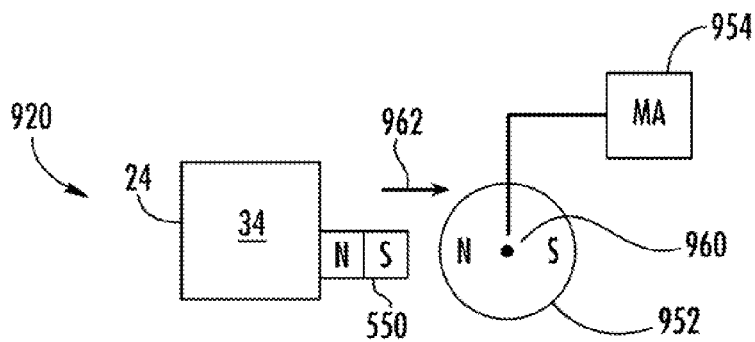
FIG. 12 is a schematic illustration of another example electronic device having a key in a retracted state.

FIG. 12 illustrates electronic device 920, another example implementation of electronic device 520. Electronic device 920 is similar to electronic device 520 except that electronic device 920 specifically comprises magnet 952 and magnet actuator 954 in place of magnet 552 and magnet actuator 954, respectively. Magnet 952 comprises a magnet rotatable about an axis 960. Magnet actuator 954 comprises a device configured to rotate magnet 952, such as a stepper motor, a transmission utilizing torque of the display panel hinge or another rotational device. As shown by FIG. 12, magnet actuator 954 is configured to rotate magnet 952 to a position such that magnet 952 attracts magnet 550 to apply transverse force in the direction indicated by arrow 962. Similar to electronic device 520, electronic device 920 utilizes such attractive magnetic forces to move key 24 to the retracted state by moving ramp riders 32 downward along ramps 26 (shown in FIG. 6). To move magnet 952 out of the retracting state, magnet actuator 954 rotates magnet 952 such that the same poles are positioned proximate to one another such that magnet 952 repels magnet 550 which results in key 24 being moved along ramps 26 (shown in FIG. 6) to the raised state.

Figure 13:
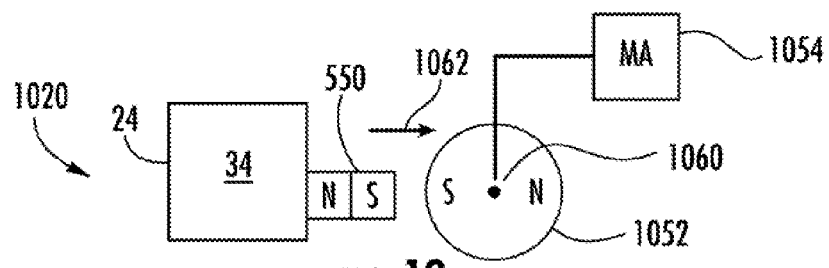
FIG. 13 is a schematic illustration of another example electronic device having a key in a retracted state.

FIG. 13 illustrates electronic device 1020, another example implementation of electronic device 620. Electronic device 1020 is similar to electronic device 620 except that electronic device 1020 specifically comprises magnet 1052 and magnet actuator 1054 in place of magnet 552 and magnet actuator 954, respectively. Magnet 1052 comprises a magnet rotatable about an axis 1060. Magnet actuator 1054 comprises a device configured to rotate magnet 1052. As shown by FIG. 13, magnet actuator 1054 is configured to rotate magnet 1052 to a position such that magnet 1052 repels magnet 550 to apply transverse force in the direction indicated by arrow 1062. Similar to electronic device 620, electronic device 1020 utilizes such repulsive magnetic forces to move key 24 to the retracted state by moving ramp riders 32 downward along ramps 26 (shown in FIG. 7). To move magnet 1052 out of the retracting state, magnet actuator 1054 rotates magnet 1052 such that different poles are positioned proximate to one another such that magnet 1052 attracts magnet 550 which results in key 24 being moved along ramps 26 (shown in FIG. 7) to the raised state.

Figure 14:
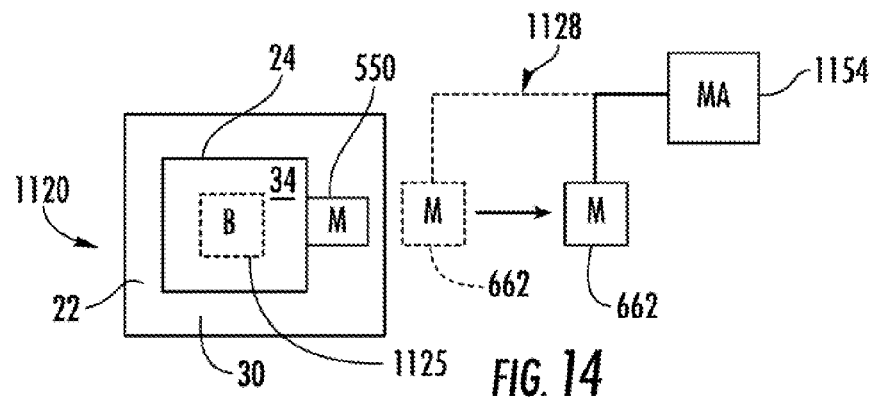
FIG. 14 is a schematic illustration of another example electronic device having a key in a retracted state.

FIG. 14 illustrates electronic device 1120, another implementation of electronic device 520. Electronic device 1120 comprises deck 22, key 24, bias 25, and retraction mechanism 1128. Deck 22 and the key 24 are described above with respect to electronic device 620. Key 24 moves and is guided between a raised state and retracted state. Key 24 includes key riders 32 which ride along ramps 26.

Bias 1125 comprises a mechanism to resiliently biased key 24 to the raised state. In one implementation, bias 1125 resiliently biases key 24 to the raised state independent of retraction mechanism 1128. In one implementation, bias 1125 comprises a resilient rubber-like dome beneath key 24 to resiliently urge key 24 to the raised state.

Retraction mechanism 1128 is similar to retraction mechanism 628 except that retraction mechanism 1128 comprises magnet actuator 1154 which physically moves magnet 662 between a retracting state in which magnet 662 is sufficiently close to magnet 5502 interacts magnet 550 to move key 24 against bias 1125 to the retracting state and a withdrawn state in which magnet 662 is sufficiently spaced from magnet 550 such that any magnetic forces are insufficient to overcome the bias 1125, resulting in key 24 resiliently returning to the raised state.

Figure 15:
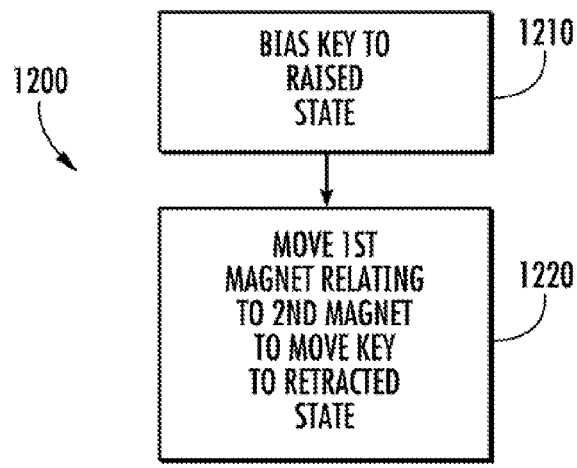
FIG. 15 is a flow diagram of an example method that may be carried out by the electronic device of FIGS. 6-14.

FIG. 15 is a flow diagram of an example method 1200 that may be carried out by any of electronic devices 520, 620, 720, 820, 920, 1020 or 1120. As indicated by step 1210, key 24 is resiliently biased towards the raised state in which the top surface 34 of key 24 extends above the top surface 30 of deck 22. As indicated by step 1220, a first magnet is moved relative to a second magnet to move key 24 to the retracted state in which the top surface 34 of key 24 resides at or below the top surface of deck 22.

Figure 16:
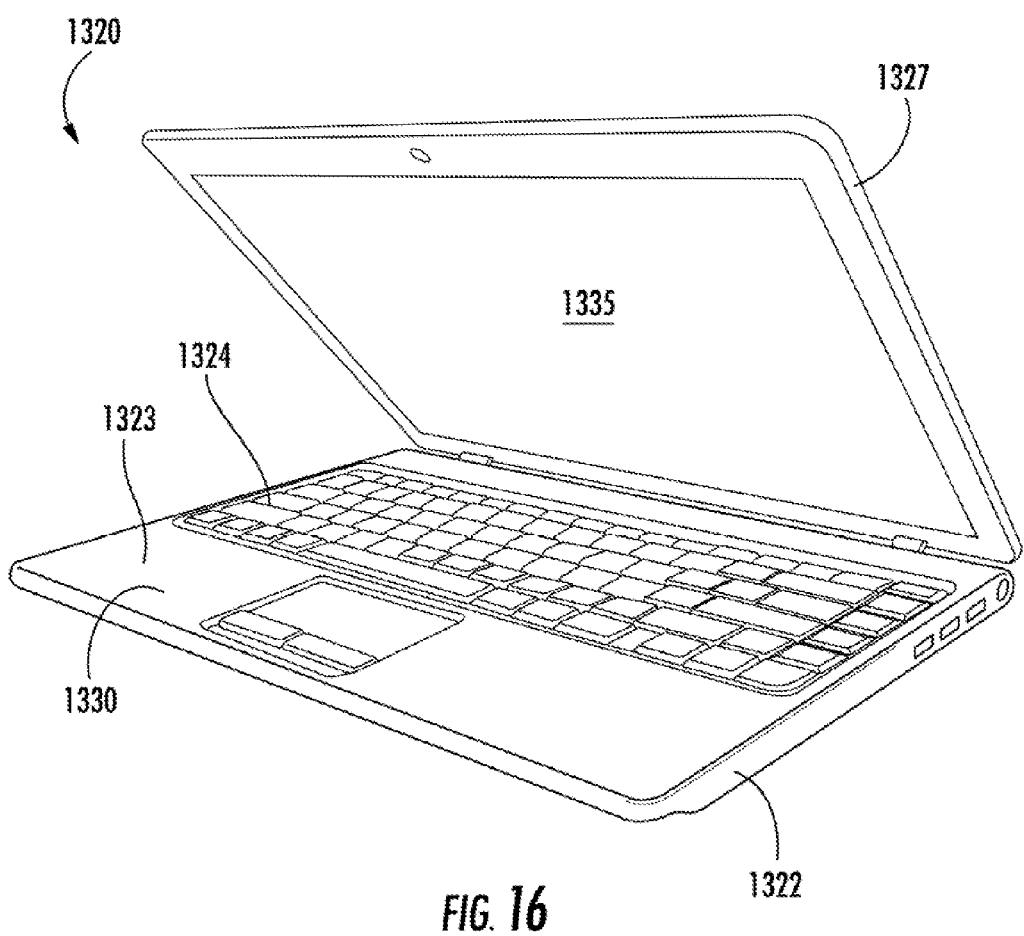
FIG. 16 is a front perspective view of another example electronic device.

FIG. 16-23 illustrates electronic device 1320, an example implementation of electronic device 620. Although shown as being provided as part of an electronic device comprising a laptop computer, the features described with respect to electronic device 1320 may similarly be provided in other electronic devices having pivoting display panels. As shown by FIG. 16, electronic device 1320 comprises deck 1322, keys 1324, ramps 1326, display panel 1327 and retraction mechanism 1328 (shown in FIG. 17).

Deck 1322 comprises a base structure housing electronic components of device 1320 and supporting keys 1324. In some implementations, deck 1322 may support additional input devices as well such as touchpads, switches, slider bars and the like. Deck 1322 may have a variety of different sizes, shapes and configurations depending upon the use of electronic device 1320. Deck 1322 comprises a top panel 1323 having an upwardly facing surface 1330 above which keys 1324 proudly rise when display panel 1327 is opened or raised.

Keys 1324 comprise an arrangement of one or more manually depressable protuberances or projections to facilitate the input of information, selections or commands to electronic device 1320. Each of the individual keys 1324 is movable against a resilient bias from a raised state in which an uppermost surface 1332 of keys 324 proudly project above surface 1330 to a depressed state. In the depressed state, the uppermost surface of the individual key 1324 projects or rises above surface 1330 of deck 1322. In another implementation, in the depressed state, the uppermost surface 1332 of the individual key 1324 is depressed to a height below the top surface 1330 of deck 1322. Movement of the individual key 1324 to the depressed state triggers the transmission of a signal to a processing unit indicating the selection of the individual key 1324. When the individual key is manually released, individual key resiliently returns to the raised state.

In the example illustrated, keys 1324 comprise a QWERTY keyboard comprising depressable keys representing alphanumeric symbols. In another implementation, keys 1324 may be part of a keyboard or keypad having a plurality of keys having other types of keys, other numbers of keys and other layouts of keys.

Figure 21:
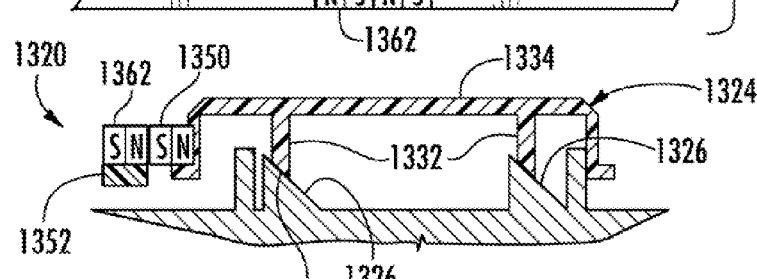
FIG. 21 is a sectional view of the key of FIG. 20.

FIG. 21 illustrates one of keys 1324 in more detail. As shown by FIG. 21, key 24 further comprises a ramp rider 1332 which rides against along ramp 1326. In the example illustrated, ramp rider 1332 itself comprises a sloped surface or ramp 1336 which slides along ramp 1326. In other implementations, ramp rider 1332 may omit ramp 1336.

Each of ramps 1326 comprises a sloped surface along which ramp rider 1332 slides or rolls as it moves from the raised state to a retracted state. Ramp 1326 converts or redirects received sideways or transverse motion or force into a downward force to move key 1324 to the retracted state. In the example illustrated, ramp 1326 is supported by and extends from portions of deck 1322 below surface 1330. In implementations where key 1324 includes a ramp or sloped surface, such as sloped surface 1336, ramp 26 may be replaced with a ramp rider that slides or rolls along the slope surface 1336.

Figure 17:
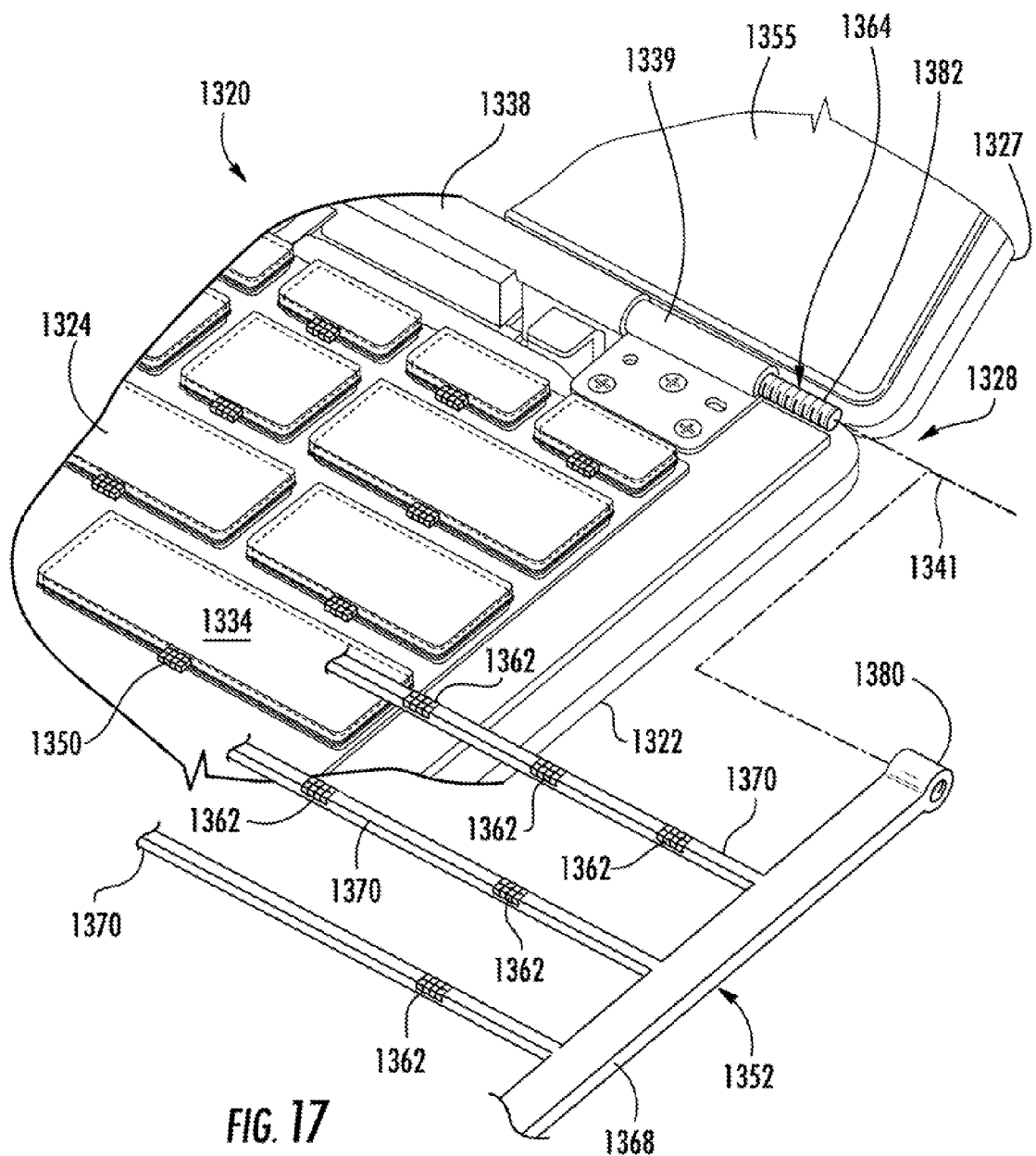
FIG. 17 is an exploded fragmentary perspective view of the electronic device of FIG. 1.
Figure 18:
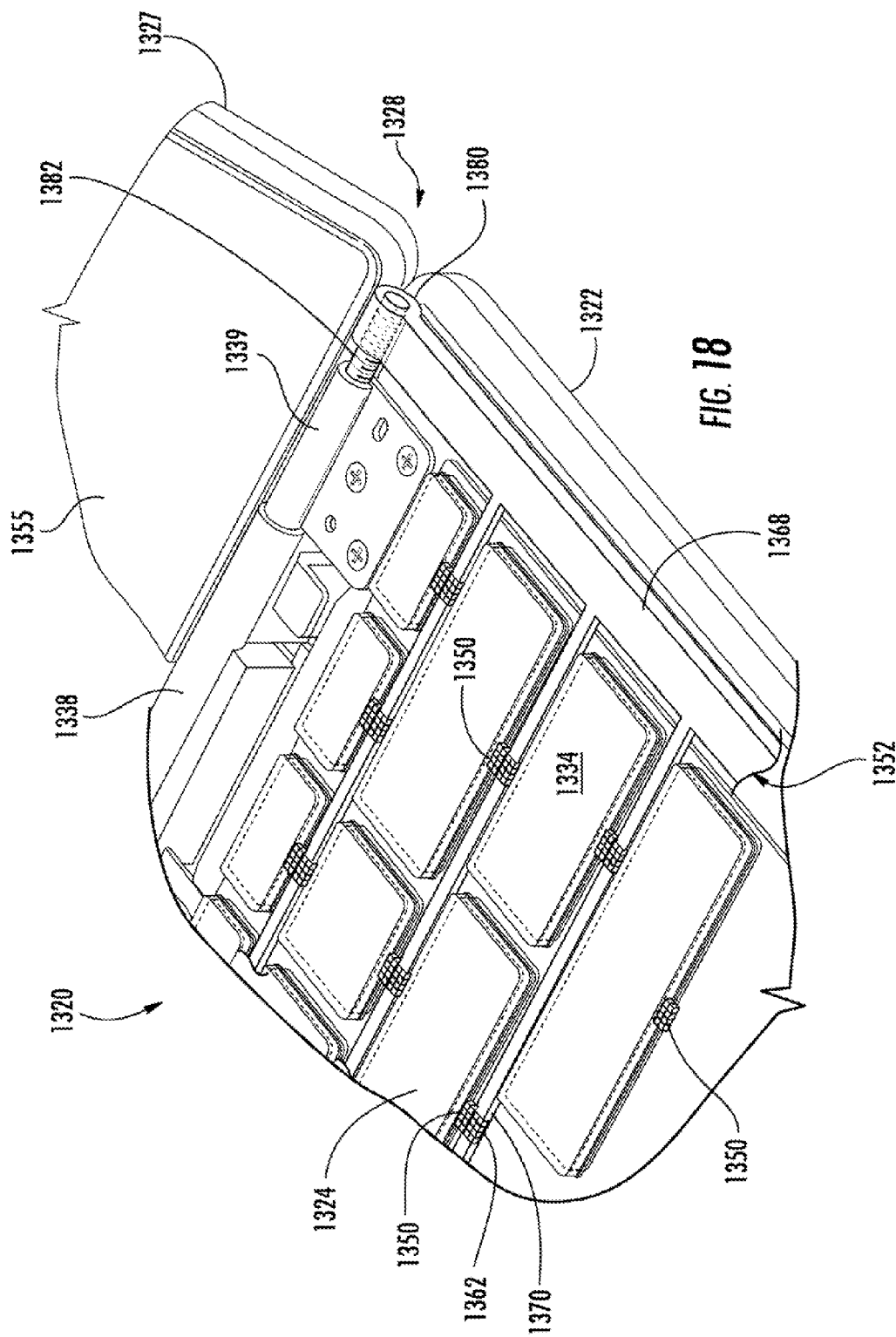
FIG. 18 is a fragmentary perspective view of the electronic device of FIG. 17 having keys in a raised state.
Figure 19:
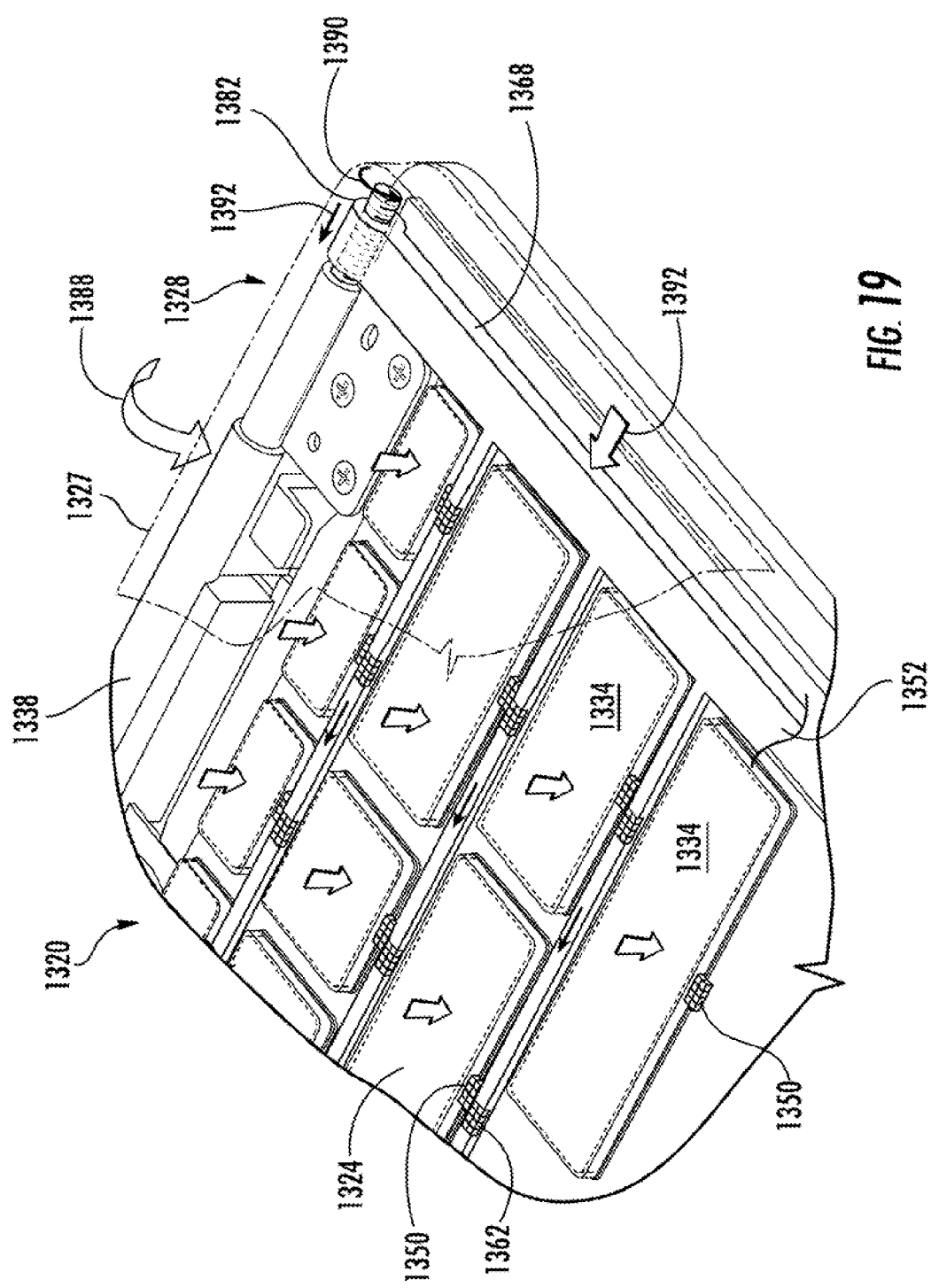
FIG. 19 is a fragmentary perspective view of the electronic device of FIG. 19 having keys in a retracted state.

Display panel 1327 comprises a panel supporting a display screen 1335 pivotally coupled to deck 1322 for movement between an open or deployed position shown in FIGS. 16-18 and a covering or closed position as shown in FIG. 19. FIG. 17 illustrates a portion of electronic device 1320 with the top panel 1323 omitted. As shown by FIG. 17, display panel 1327 comprises a hinge shaft 1338 extending from the lower edge of display panel 1327 and hinged to deck by sleeve 1339 for pivotal movement about axis 1341. In other implementations, display panel 1327 may be pivotally coupled to deck 1322 by other pivot mechanisms.

Retraction mechanism 1328 applies a sideways or transverse force or motion to each of keys 1324 to move each of keys 1324 along their respective ramps 1326 to retracted states. As shown by FIG. 17, retraction mechanism 1328 comprises key magnets 1350, retraction frame 1352 carrying magnets 1362 and retraction drive 1364. Key magnets 1350 each comprise a bit magnet having a plurality of North polarities and a plurality of South polarities alternating along a side of key 24. In the example illustrated, key magnets 1350 are supported by key 24 and carried by key 1324 on an exterior of key 1324. In other implementations, key magnets 1350 may be supported within the associated key 1324 beneath top surface 1334. Key magnets 1350 interact with magnets 1362 to move key 1324 along ramps 1326.

Retraction frame 1352 comprises a horizontally translatable or slidable structure that extends transversely and horizontally (from the left side to the right side of deck 1322 when facing display screen 1335 in a deployed position) below panel 1327. Retraction frame 1352 comprises an end bar 1368 and a plurality of legs 1370. End bar 1368 extends along a side of the collection of keys 1324 and joins each of legs 1370. Legs 1370 extend from end bar 1368 across the collection of keys 1324 in the gaps or spaces between the rows of keys 1324. Each leg 1370 carries at least one magnet 1362 corresponding to each key magnet 1350. Each magnet 1362 comprises a bit magnet having a plurality of North polarities and a plurality of South polarities alternating along a side of the associated leg 1370. Frame 1352 is horizontally translatable or slidable by retraction drive 1364 in a transverse direction parallel to axis 1341 across keys 1324 in the gaps or spaces between the rows of individual keys 1324. In another implementation, retraction frame 1352 extends longitudinally or fore and aft (from the front edge portion to the rear edge portion of deck 1322 towards display panel 1327) and is horizontally translatable or slidable by retraction drive 344 perpendicular to axis 1341.

Retraction drive 1364 comprises a mechanism mechanically and operably coupling hinge shaft 1338 of display panel 1327 to retraction frame 1352 to automatically translate frame 1352 in response to or based upon pivoting of display panel 1327. In the example illustrated, retraction drive 1364 comprises lead nut 1380 and lead screw 1382. Lead nut 1380 comprises an internally threaded member coupled to end bar 1368 and fixed against rotation. Lead screw 1382 comprises an externally threaded shaft extending from pivot shaft 1338 so as to rotate with pivot shaft 1338. Lead screw 1382 comprises external helical threads that engage the internal threads of lead nut 1380 such that upon rotation of lead screw 1382 in response to pivoting of display panel 1327, end bar 1368 is linearly and horizontally translated in the directions parallel to axis 1341. In particular, as display panel 1327 is pivoted downward towards the closed position and towards deck 1322, frame 1352 is driven to the left as seen in FIG. 17.

Figure 20:
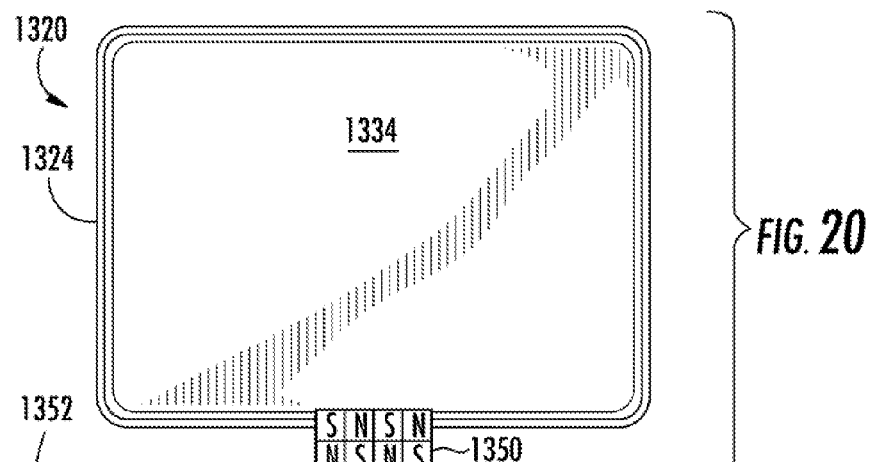
FIG. 20 is an enlarged top view of an individual key of the electronic device of FIG. 18.
Figure 22:
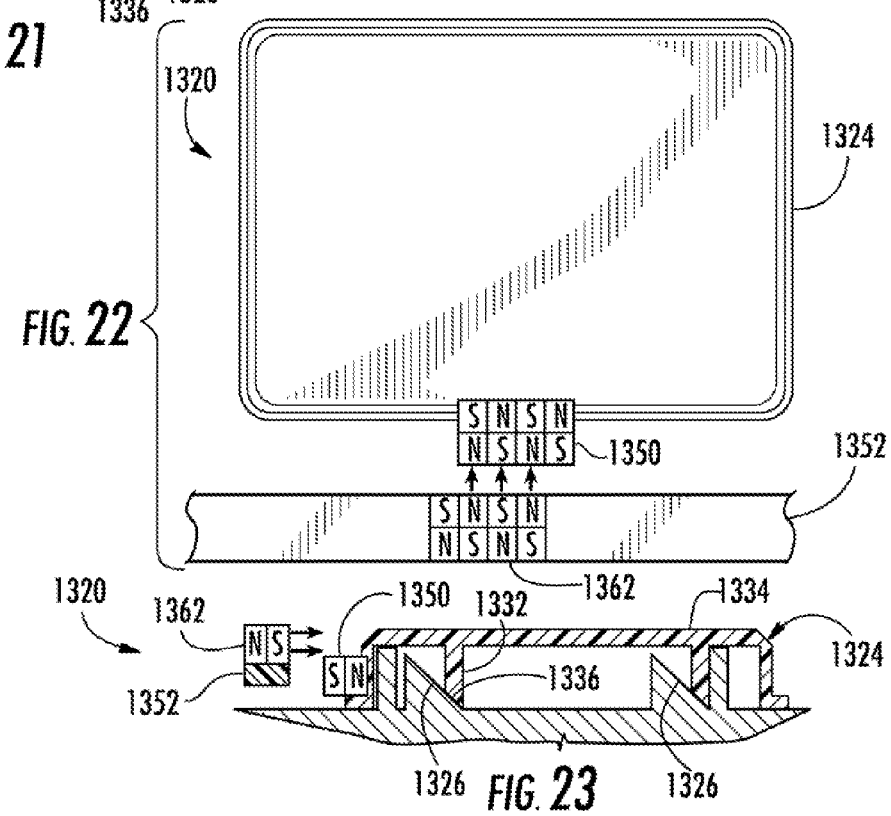
FIG. 22 is an enlarged top view of an individual key of electronic device of FIG. 19.
Figure 23:
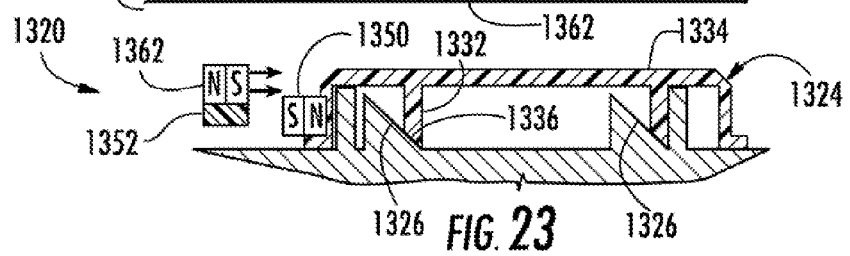
FIG. 23 is a sectional view of the key of FIG. 22.

FIGS. 18-23 illustrate retraction of keys by retraction mechanism 1328. FIGS. 18, and 20-21 illustrate retraction frame 1352 in a key raising position while FIGS. 19 and 22-23 illustrate retraction frame 1352 in the retracting position. As shown by FIGS. 18, 20-21, when in the key raising position, poles of magnets 1362 are located substantially opposite to opposite poles of magnets 1350. As a result, magnets 1362 attract magnets 1350 such that each of the keys 1324 is resiliently biased upward along ramps 1326 to the raised state in which the top surface 1332 of each key 1324 rises above or is located above the top surface 1330 of deck 1322.

As shown by FIG. 19, pivoting of display panel 1327 (shown in phantom and partially broken away) towards the closed position as indicated by arrow 1388 rotates the hinge shaft 1338 which also results in rotation of lead screw 1382 in the direction indicated by arrow 1390. Rotation of lead screw 1382 results in lead nut 1380 and retraction frame 1352 being linearly translated in the direction indicated by arrows 1392. As shown by FIGS. 19, 22 and 23, such linear translation in the direction indicated by arrow 1392 translates magnet 1362 relative to magnet 1350 such that the same poles of magnets 1350 and 1362 extend opposite one another. As a result, magnet 1362 repels magnet 1350 and the associated key 1324 to move the associated key along ramps 1326 and to drive the associated individual key 3124 downwards to the retracted state. When display panel 1327 is pivoted upward to a raised or deployed position, the above described operations are reversed such that frame 1352 is moved back to the key raising position shown in FIGS. 18 and 20-21. As a result, each of keys 1324 once again resiliently returns to the raised state, ready for individual manual depressment.

Although retraction drive 1364 is illustrated as comprising not 1380 and lead screw 1382 operably coupled between pivot shaft 1336 and end bar 1368 of retraction frame 1352, in other implementations, retraction drive 1364 may be provided by other devices. For example, retraction drive 1364 may alternatively comprise a worm screw rotating with him shaft 1338 and a corresponding rack gear carried by retraction frame 1352. Retraction drive 1364 may alternatively comprise a cam and cam follower arrangement such that rotation of the cam by hinge shaft 1338 cause the cam to interact with a cam follower carried by retraction frame 1352 to linearly translate retraction frame 1352. In such an implementation, a cam and cam follower, such as a pin and slot mechanism, may be configured to provide a dwell delaying the initiation of linear translation of retraction frame 1352 until display panel 1327 has been pivoted to within a predetermined angle of deck 1322 prior to reaching the closed position. In still other implementations, other retraction drives may be utilized to operably couple the pivoting of display panel 1327 to the linear translation of retraction frame 1352.

Figure 24:
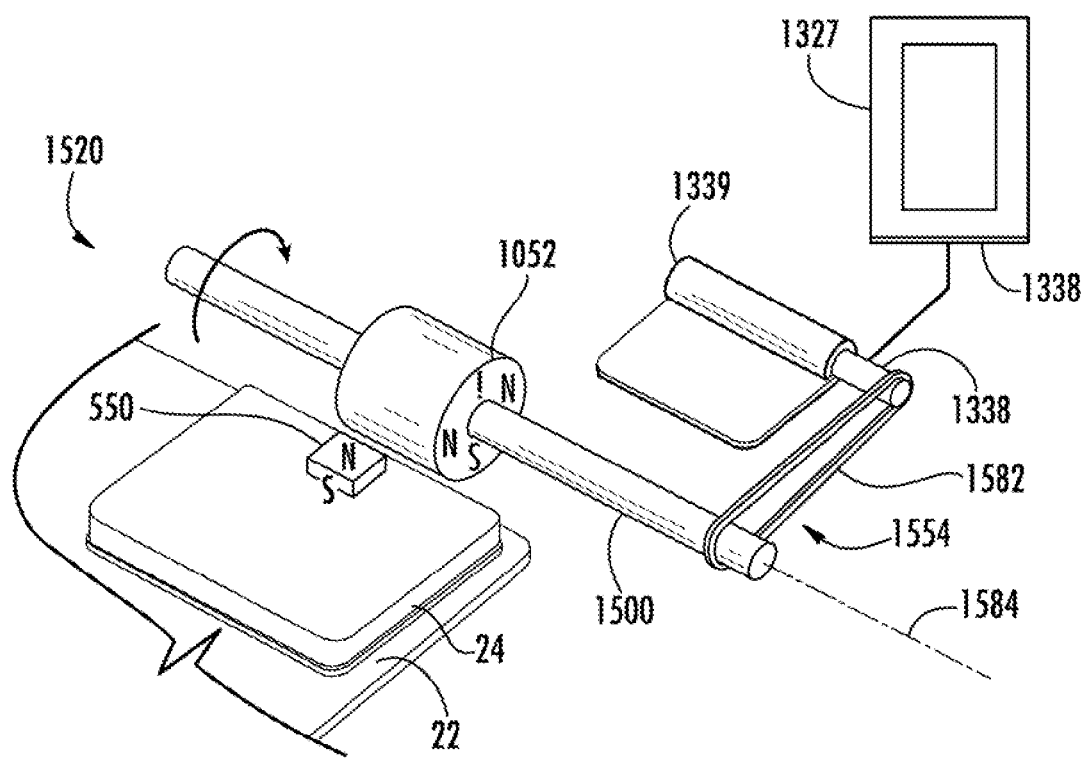
FIG. 24 is a fragmentary perspective view illustrating another implementation of the electronic device of FIG. 13.

FIG. 24 illustrates electronic device 1520, an example implementation of electronic device 1020. Electronic device 1520 comprises display panel 1327, deck 22, key 24, magnet 550 and magnet 1052 described above. Electronic device 1520 further comprises magnet actuator 1554. Magnet actuator 1554 moves magnet 1052 between a raising position and a retracting position by rotating magnet 1052 to selectively position a first pole opposite of magna 550 so as to attract magnet 550 to move key 24 upward along ramps 26 (shown in FIG. 2) or to position a second pole opposite to magnet 550 so as to repel magnet 550 to move key 24 downward along ramps 26 (shown FIG. 2). In the example illustrated, magnet actuator 1554 rotates magnet 1052 in response to pivoting of hinge shaft 1338 of display panel 1327. In the example illustrated, magnet actuator 1554 utilizes the torque generated by the pivoting of display panel 1327 to rotate magnet 1052.

Magnet actuator 1554 comprises magnet support shaft 1580 and rotation coupler 1582. Magnet support shaft 1580 comprises a shaft supporting magnet 1052 and rotatable about axis 1584. Rotation coupler 1582 comprises a mechanism configured to transmit rotation of hinge shaft 1338 to shaft 1580. In the example illustrated, rotation coupler 1582 comprises a looped structure such as a belt and pulley arrangement, toothed belt and sprocket arrangement, a chain and sprocket arrangement and the like. In another implementation, rotation coupler 1582 comprises other mechanisms for transmitting torque from him shaft 1338 to shaft 1580 such that rotation of hinge shaft 1338 results in rotation of shaft 1580.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a deck;
    a depressable key movable between a raised state and a retracted state;
    a sloped surface;
    a retraction mechanism to move the depressable key downward along the sloped surface to the retracted state;
    a first magnet supported by one of the deck and the key;
    a second magnet supported by the other of the deck and the key; and
    a display panel pivotably coupled to the deck, wherein the first magnet horizontally translates in response to pivoting of the display panel towards the deck.

2. The apparatus of claim 1, wherein
    the first magnet is movable between a first position relative to the second magnet in which the key is in the raised state and a second position relative to the second magnet in which the first magnet magnetically interacts with the second magnet to move the key to the retracted state.

3. The apparatus of claim 2, wherein the first magnet repels the second magnet in the second position.

4. The apparatus of claim 3, wherein the first magnet attracts a second magnet in the second position to move the key to the raised state.

5. The apparatus of claim 4, wherein the first magnet is supported by the deck.

6. The apparatus of claim 5, wherein the first magnet is horizontally translatable between the first position and the second position.

7. The apparatus of claim 2, wherein the first magnet is supported by the deck.

8. The apparatus of claim 7, wherein the first magnet is horizontally translatable between the first position and the second position.

9. The apparatus of claim 8, wherein the first magnet horizontally translates towards the second position in response to the pivoting of the display panel towards the deck.

10. The apparatus of claim 9, wherein the display panel is operably coupled to the first magnet such that torque generated by pivoting of the display panel is transmitted to the first magnet to horizontally translate the first magnet.

11. The apparatus of claim 7 further comprising a horizontally movable retraction frame extending between the key and a second key, the retraction frame carrying the first magnet.

12. A method comprising:
    biasing a depressable key to a raised state relative to a deck;
    receiving a transverse force when a display panel pivotably connected to the deck is to be pivoted towards the deck; and
    redirecting the transverse force with a sloped surface to retract the key from the raised state.

13. The method of claim 12 further comprising moving a first magnet to a first position relative to a second magnet to provide the transverse force.

14. An apparatus comprising:
    a deck;
    a depressable key movable between a raised state and a retracted state;
    a first magnet supported by one of the deck and the key;
    a second magnet supported by the other of the deck and the key, wherein the first magnet is movable between a first position relative to the second magnet in which the key is in the raised state and a second position relative to the second magnet in which the first magnet magnetically interacts with the second magnet to move the key to the retracted state; and
    a display panel pivotably coupled to the deck, wherein the first magnet horizontally translates to the second position in response to pivoting of the display panel towards the deck.

* * * * *